March 12, 1957 C. E. KRAUS 2,784,604
SPEED CHANGER
Filed July 20, 1953 2 Sheets-Sheet 1
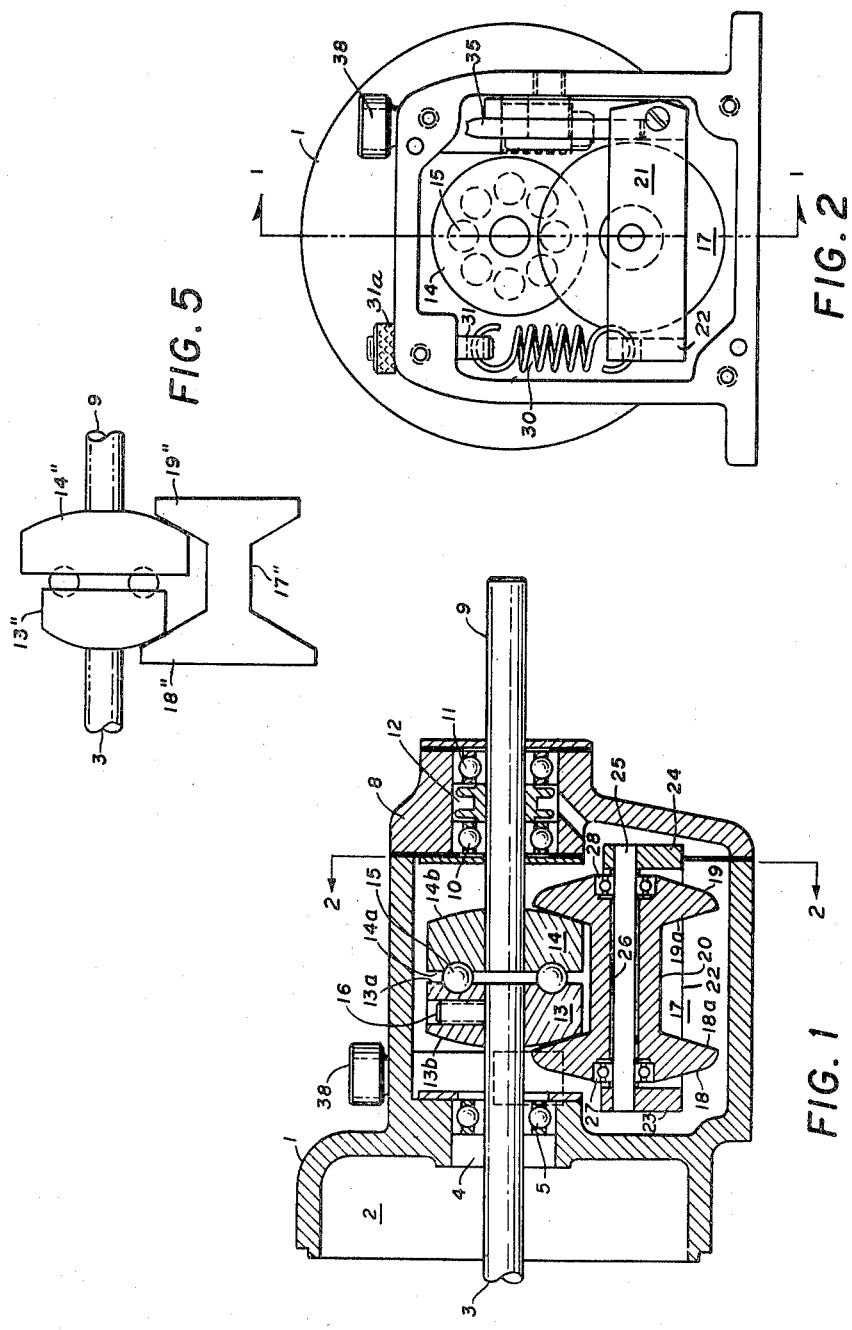

March 12, 1957
C. E. KRAUS
2,784,604
SPEED CHANGER
Filed July 20, 1953
2 Sheets-Sheet 2
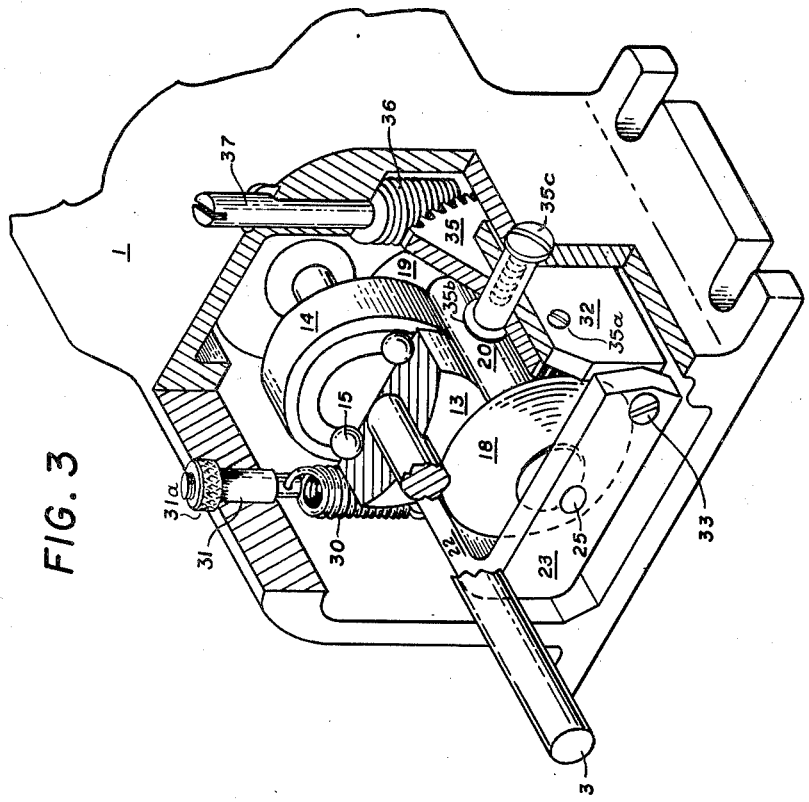

United States Patent Office 2,784,604
Patented Mar. 12, 1957

2,784,604

SPEED CHANGER

Charles E. Kraus, Rochester, N. Y., assignor to Excelermatic, Inc., a corporation of New York Application July 20, 1953, Serial No. 369,041

7 Claims. (Cl. 74—199)

This invention relates to power transmission devices and more particularly to variable speed means of the all-metal friction type wherein the output speed is progressively variable relative to the input or driving speed throughout a wide range of speeds.

It is an object of this invention to provide a new and improved friction type speed changer which is particularly useful in connection with the transmission of power at fractional horsepower values, which is of minimum size, embodies a minimum number of parts, is inexpensive, rugged, long-lived, and easy to assemble, and which provides continuous change of speed ratio over a wide range.

In accomplishing the foregoing objects, according to the preferred embodiment of my invention, I provide axially aligned driving and driven shafts carrying adjacent driving and driven disks. A power transmission element having spaced-apart disk-like portions is provided in such a position that the inner surfaces of such portions engage the non-adjacent faces of the disks. Thus the driving disk causes rotation of the power-transmitting element, which in turn causes rotation of the driven disk and shaft. Speed ratio change is accomplished by adjusting the points of engagement between the disks and the portions.

My invention, together with other objects and advantages will be best understood from the accompanying description taken in connection with the accompanying drawings in which Figure 1 is a sectional view of one embodiment of my invention taken along the line 1—1 of Fig. 2, Figure 2 is an end view of a part of the apparatus shown in Fig. 1 taken along the line 2—2 of Fig. 1, Figure 3 is a perspective view, partly in section and partly broken away, of the embodiment shown in Figs. 1 and 2, Figure 4 illustrates a second embodiment of my invention, and Figure 5 represents a modification of the invention shown in Figs. 1 to 4, inclusive.

The embodiment of my invention illustrated in Figs. 1 to 3, inclusive, is contained in a suitable housing comprising a casing 1 having an end portion 2 for a suitable source of driving power, as an electric motor, for example, connected to driving shaft 3 which is suitably journalled in a centrally located opening 4 in portion 2 as by means of a suitable ball bearing assembly 5. A suitable oil seal (not shown) may also be provided.

An end housing 8 may be provided for closing the other end of speed changer casing 1 in any manner, not shown. A second or driven shaft 9 is suitably mounted for rotation in housing 8 as by means of suitable ball bearing assemblies 10 and 11 and seal 12. Driving shaft 3 and driven shaft 9 are axially aligned and the inner ends are closely adjacent each other.

The adjacent ends of shafts 3 and 9 are provided with corresponding disks 13 and 14, respectively, of substantially larger diameter than the respective shafts, the adjacent faces 13a and 14a being preferably flat and arranged as by means of corresponding recesses to receive ball bearings 15 between the faces 13a and 14a, respectively, in order to take up thrust between the disks.

Means is provided to enable axial adjustment of driving member or disk 13 relative to driven member 14, as for example a suitable set screw 16.

Means is provided for transferring the rotation of shaft 3 to shaft 9. In the illustrated form of my invention, a power transfer member 17, is mounted for rotation about an axis parallel to and spaced from shafts 3 and 9. Member 17 as shown somewhat resembles a dumbbell or spool, having spaced-apart end portions 18 and 19 having inner faces or surfaces 18a and 19a, respectively disposed for frictional engagement with non-adjacent faces 13b and 14b respectively of disks 13 and 14 and a hub or central portion 20.

In order to support power transfer member or element 17 in an operative position, there is provided a U-shaped member or bracket 21 having a base portion 22 and arm portions 23 and 24. A pivot member or pin 25 extends through a suitable opening in arm 23 intermediate the ends thereof into a suitable opening intermediate the ends of arm 24. The pin 25 may be held in any desired manner as by a press fit, for example. Member 17 is axially bored as indicated at 26 to receive pin 25 and is rotatably carried by pin 25 as by means of ball bearing assemblies 27 and 28.

Spring means is provided at the base of carrier 21 for urging the end carrying disk-like portion 19 toward disk 14. As shown in the drawing, a coil spring 30 is fastened at one end to arm 22 and at the upper end to a member 31. To provide adjustment of the spring, I provide a nut or knob 31a.

In order to position disk-like portion 18 in operative position with respect to disk 13, as well as to provide means for adjusting the speed ratio of shafts 3 and 9, a bracket member 32 is carried between the ends of arms 23 and 24 as by means of pin 33 extending through corresponding openings in arms 23 and 24 in any suitable manner.

Bracket 32 is provided with a worm wheel 35 as by means of a screw 35a, the assembly of worm wheel 35 and bracket 32 being pivotally carried by casing 1 as by means of a headed pivot pin 35b and screw 35c. A suitable worm gear 36 is supported in operative relationship to wheel 35 as by means of vertically extending shaft 37 which projects upwardly through a suitable bore in casing 1. The outer end of shaft 37 carries an adjusting knob 38.

As knob 38 is turned, worm wheel 35 is rotated to cock or incline bracket 32 and pin 33, the point of engagement between spring 30 and portion 22 of bracket 21 serving as a reference point. Thus the arms 23 and 24 are raised or lowered with respect to each other.

The resulting movement of disk-like members 18 and 19 causes the points of contact between surfaces 18a and 13b and between surfaces 19a and 14b to shift.

In the embodiment of Figs. 1 to 3, surfaces 18a and 19a are flat although inclined relative to central portion 20 while surfaces 13b and 14b are curved to provide, in effect, gear tooth profiles so that the point of contact may shift similarly to the line of action of gear teeth. There is thus provided a split gear tooth comprising the disks 13 and 14 and mating profile sections (members 18 and 19) rockably carried by shaft 25 which is generally parallel to shafts 3 and 9, these profile sections being arranged to mesh with the split gear tooth. As shown in Fig. 1, the speed ratio between shafts 3 and 9 is approximately 1 to 1 inasmuch as the points of contact are about the same distance from the center lines of shafts 3 and 9. If knob 38 is turned in such a way as to raise arm 23 and portion 18 relative to arm 24 and portion 19, member 17 shifts in a clockwise direction so that the point of engagement between surfaces 13b and 18a moves closer to shaft 3 and the area of engagement between surfaces 14b and 19a moves away from shaft 9 against the tension of spring 30, and the speed of the output or driven shaft 9 decreases.

Conversely, if member 17 is rocked the other way, as portion 18 moves downwardly, portion 19 moves upwardly because of spring 30 and the corresponding areas of engagement move likewise.

In Fig. 4 there is shown a modification of my invention in which a bracket or arm 40 which carries one end of pin 25 is biased upwardly by a spring 41 and a second bracket or arm 42 which carries the other end of pin or pivot 25 is connected to a bifurcated leaf spring 43, the spring 43 being arranged for vertical movement according to the rotation of knob 44 to shift the areas of engagement between disks 13 and 14 and portions 18 and 19, respectively.

In Fig. 5, there is shown a modification in which the portions 18" and 19" of power transmission element 17" are of different diameters, thereby providing for a different range of speed ratios.

What I claim is:

1. In a friction type speed changer, axially aligned driving and driven shafts, a disk carried by each of said shafts at the adjacent ends thereof, an element for transmitting power from the driving to the driven shaft comprising spaced apart disk-like portions corresponding to said disks, the inner surfaces of said portions having frictional engagement with the respective non-adjacent faces of said disks.

2. The speed changer of claim 1 in which means is provided for varying the relative points of contact between said inner surfaces and said non-adjacent faces in order to change the speed ratio between said shafts.

3. The speed changer of claim 1 in which said non-adjacent faces are curved relative to said inner surfaces and said inner surfaces are flat and inclined relative to said non-adjacent faces.

4. In the speed changer of claim 1, a U-shaped member, means for rotatively supporting said element between the arms of said member, means for biasing the base portion of said member in a direction tending to urge said element into frictional engagement with said disks, and means for rocking the arms of said member for varying the points of engagement between said inner surfaces and said non-adjacent faces.

5. The speed changer of claims 1 to 4 in which means is provided for taking up thrust between said disks.

6. In a friction type speed changer, axially aligned driving and driven shafts, a split gear tooth carried by adjacent ends of said shafts, another shaft generally parallel to said driving and driven shafts, and a pair of tooth profile sections carried by said another shaft and being disposed to engage non-adjacent corresponding surfaces of said split gear tooth.

7. The device of claim 6 in which means is provided for varying the relative points of contact between said split gear tooth and said profile sections in order to change the speed ratio between said shafts.

References Cited in the file of this patent

UNITED STATES PATENTS

| | | |
|---|---|---|
| 1,017,877 | Landis | Feb. 20, 1912 |
| 1,459,979 | Kohn | June 26, 1923 |
| 1,843,426 | Lee | Feb. 2, 1932 |
| 2,268,948 | Lampton et al. | Jan. 6, 1942 |
| 2,595,439 | Arato | May 6, 1952 |

FOREIGN PATENTS

| | | |
|---|---|---|
| 311,958 | Great Britain | May 23, 1929 |